United States Patent Office 3,482,019
Patented Dec. 2, 1969

3,482,019
METHOD OF CONTROLLING PESTS WITH PENTAHALOCYCLOPENTADIENYL - SUBSTITUTED PHOSPHATES
Edward D. Weil, Yonkers, N.Y., and Sheldon B. Greenbaum, Livingston, N.J., assignors to Hooker Chemical Corporation, Niagara Falls, N.Y., a corporation of New York
No Drawing. Continuation-in-part of application Ser. No. 353,616, Mar. 20, 1964. This application Aug. 30, 1966, Ser. No. 575,961
Int. Cl. A01n 9/36
U.S. Cl. 424—211          11 Claims

ABSTRACT OF THE DISCLOSURE

A method of controlling pests by applying to the locus of said pests a pesticidal amount of a pentahalocyclopentadienyl-substituted phosphates.

This is a continuation-in-part of Ser. No. 353,616, filed Mar. 20, 1964, now issued as United States Patent 3,277,211.

The invention relates to novel compositions of matter and their uses. More specifically, the present invention relates to the pesticidal use of novel halogenated phosphorohalidates and derivatives thereof.

The novel compounds of the present invention are useful as chemical intermediates, pesticides and herbicides.

The novel compounds of this invention can be represented by the following general formula:

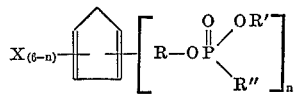

wherein:

X is a halogen atom, such as chlorine or bromine;
R is an alkylene radical containing from 2 to about 6 carbon atoms, of which the free valences are on separate carbon atoms, said separate carbon atoms preferably being separated by not more than 2 carbon atoms, said alkylene radical being an organic radical which may be considered to be a divalent or polyvalent aliphatic radical;
R' is a radical selected from the group consisting of alkyl, aryl and substituted aryl;
R" is selected from the group consisting of halogen, hydroxy, amino, substituted amino, alkoxy, alkoxyalkoxy, alkylmercaptoalkoxy, aryloxy, and substituted aryloxy; and
n is a number from 1 to 5, inclusive.

Among the R' substituents are alkyl of from 1 to about 20 carbon atoms, and preferably of 1 to about 8 carbon atoms, such as methyl, ethyl, propyl, isopropyl, butyl, isobutyl, pentyl, hexyl, heptyl, octyl, nonyl, dodecyl, hexadecyl, stearyl, eicosyl and the like, said alkyl radical being a monovalent radical which may be considered as derived from an aliphatic hydrocarbon by the removal of one hyhydrogen atom; aryl of from 6 to about 14 carbon atoms and preferably of 6 to about 10 carbon atoms such as phenyl, naphthyl, anthracyl, salicyl and the like, said aryl group being an organic radical which may be considered as derived from an aromatic hydrocarbon by the removal of one hydrogen atom; substituted aryl by alkyl of from 1 to 20 carbon atoms and preferably of from 1 to 8 carbon atoms, such as methylphenyl, ethylphenyl, propylphenyl, butylphenyl, tridecylpheny, eicosylphenyl, trimethylphenyl, methylnaphthyl, ethylanthracyl, octylphenyl, dodecylphenyl, and the like, as well as their various isomers, nitro-substituted and halogen-substituted radicals, e.g., chlorine- and bromine-substituted aryls. The R' substituent may also be attached to the R substituent by a chemical bond, when R is polyvalent.

Illustrative examples of the R" substituent include halogen, such as chlorine or bromine; hydroxy; amino; alkyl substituted amino, e.g., —NH-alkyl, —N(alkyl)$_2$; alkoxy of from 1 to about 20 carbon atoms and preferably of 1 to about 8 carbon atoms, such as methoxy, ethoxy, propoxy, butoxy, pentoxy, hexyloxy, octyloxy, decyloxy, dodecyloxy, octadecyloxy, and the like, said alkoxy substituents being an alkl radical which is attached to the remainder of the molecule by oxygen, alkylmercaptoalkoxy such as ethylmercaptoethoxy, propyl-mercaptobutoxy, and the like, aryloxy of from 6 to about 14 carbon atoms and preferably of 6 to about 10 carbon atoms such as phenoxy and aryloxy substituted by halogen, nitro, alkyl, and substituted alkyl; and alkoxyalkoxyl of 1 to about 20 carbon atoms and preferably of 1 to about 8 carbon atoms, such as 2-(methoxy) ethoxy, 2-(ethoxy) ethoxy, butoxyethoxy, ethoxypropyloxy, and the like.

Examples of novel products and reactions of the present invention wherein R' is halogen include the following:

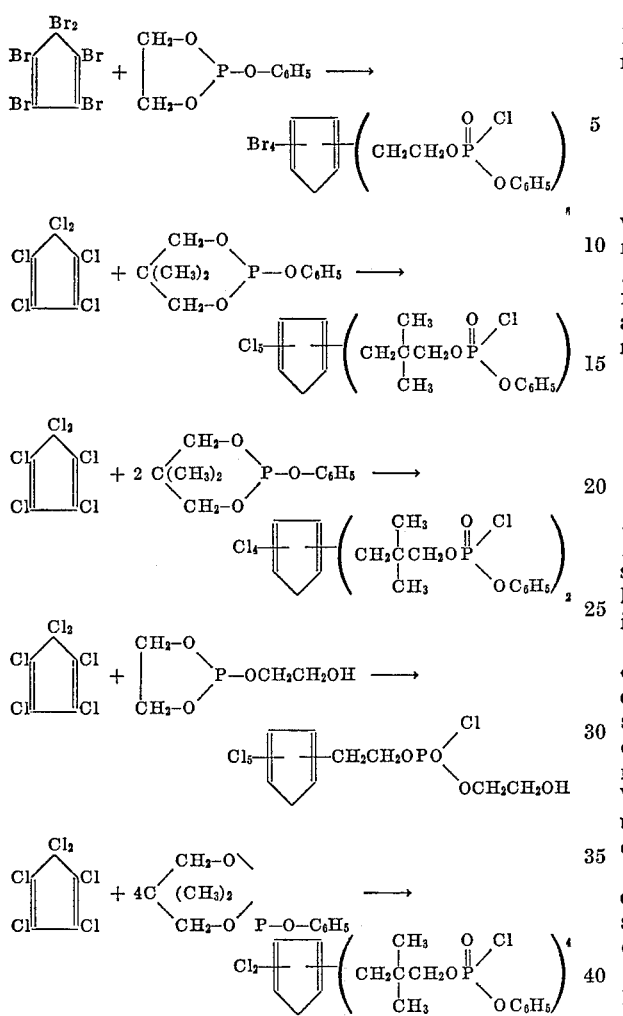

The radical R may be further substituted by a second like polyhalocyclopentadienyl group and/or by a second like phosphate group. Such a situation arises where, for example, R is a pentaerythrityl radical, a trimethylolalkane radical, or the like, as illustrated in the following two equations. The term "alkylene radical" used in respect to R is intended herein to encompass such radicals as exemplified by pentaerythrityl and trimethylolalkane radicals.

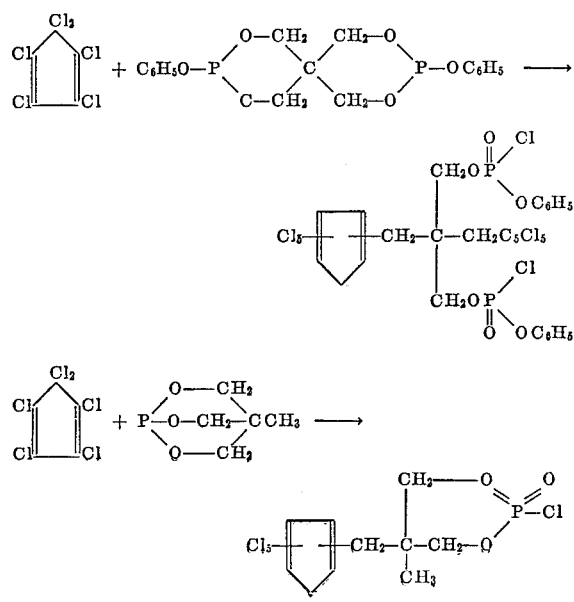

The novel compounds of the present invention wherein R″ is halogen are prepared by the reaction of hexahaloryclopentadiene with a cyclic phosphite of the formula:

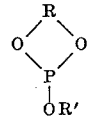

where R and R′ are as described herein. The radical R′ may in some instances be conjoined with the alkylene group R. The alkylene substituent R and R′ groups may be further substituted by alkyl, aryl, halogen, nitro hydroxy, alkoxy, and aryloxy substituents. The alkylene group R may also bear a second phosphite ring, as in the case of the pentaerythrityl bis-cyclic phosphite. These cyclic phosphites are prepared by known methods such as exemplified by the method of U.S. Patent No. 2,841,608.

Generally, the reaction is effected by admixing the reactants in the liquid phase at temperatures from as least 20 degrees centigrade to about 180 degrees centigrade. A preferred temperature range is from about 0 degrees centigrade to 150 degrees centigrade. Although no solvent has to be employed, an inert solvent, such as a hydrocarbon or an ether, can be used, if desired, to facilitate the reaction.

The reaction can be conveniently followed by titration of unreacted phosphite, using iodine or other suitable oxidant as titrating reagent. When titration indicates consumption of phosphite, the reaction is complete. The product can be used without further purification, when equimolar amounts of the reactants have been employed. Where an excess of one or the other reactant has been used, the excess may be removed by vacuum distillation or other suitable means.

Atmospheric pressure is conveniently used when conducting the process of the instant invention. However, sub- or super-atmospheric pressures may be utilized without departing from the scope of the invention.

The molar ratio of reactants is generally from about 1 mole of hexahalocyclopentadiene to about 1 to 5 moles of the phosphite, the number of phosphate groups being introduced in the cyclopentadiene ring depending on the molar ratio of reactants employed. Thus, when only one phosphite is to be introduced about 1 mole of phosphite reactant is used, while if 5 moles of phosphite are to be introduced into the cyclopentadiene ring about 5 moles of phosphite reactant are used. Excess may be employed to force the reaction. It is advantageous to add the phosphite reactant to the hexahalocyclopentadiene and it is also advantageous to employ an excess of hexahalocyclopentadiene to obtain yields of 1:1 reaction product. The use of a greater than 1:1 ratio of phosphite to cyclopentadiene is conducive to polysubstitution on the ring. Where polysubstitution is caused to occur, the products are generally mixtures and may be used as such for many applications, or may be separated by fractional distillation or other methods known in this art.

Exhaustive hydrolysis of the phosphate group results in the formation of the corresponding alcohols of the formula:

wherein R and n are as defined herein. Examples of these alcohols are 2-(pentachlorocyclopentadienyl) ethanol, 2- and 3-(pentachlorocyclopentadienyl) propanol and 2-, 3-, and 4-(pentachlorocyclopentadienyl) butanol. These alcohols are useful as pesticidal agents, especially as herbicides and as chemical intermediates.

Further reaction of the products of the present invention wherein R″ is a halogen with a nucleophilic reagent such as ammonia, an amine, an alcohol or a phenol yields polyhalocyclopentadienylalkyl phosphoramidates, O-alkyl phosphates or O-aryl phosphates, respectively, having insecticidal properties.

Hydrolysis of the compounds of the invention, where R" is halogen by treatment with water (preferably one molar equivalent added in a cosolvent such as acetone, dioxane, formic acid, or the like), yields the corresponding acid, wherein R" is hydroxyl. These acids and their salts, e.g., sodium, potassium, ammonium, methylammonium, or other lower alkyl ammonium salts exhibit herbicidal activity.

The reaction of the phosphorohalidates of the invention with ammonia or amines is conducted by admixing the products of the present invention (wherein R" is halogen) with the ammonia or amine at a temperature between about −10 degrees centigrade to 150 degrees centigrade. A catalyst is not required and although atmospheric pressure is conveniently employed, sub- or super-atmospheric pressures can be utilized.

Suitable amines include those amines containing from 1 to about 18 carbon atoms and preferably of 1 to about 6 carbon atoms such as methylamine, ethylamine, propylamine, alkylamine, isopropylamine, butylamine, amylamine, hexylamine, cyclohexylamine, dimethylamine, diethylamine, dipropylamine, dialkylamine, diisopropylamine, dibutylamine, diamylamine, dihexylamine, piperidine and morpholine.

The reaction of the phosphorohalidates with alcohol or phenols is conducted by mixing phenol or the alcohol with said phosphorohalidates and usually about a molar equivalent of base strong enough to form the alcoholate or phenolate, in the temperature range of about −10 degrees centigrade to about 150 degrees centigrade. Examples of such bases include the alkali metal hydroxides, such as sodium hydroxide, potassium hydroxide, and the like. Suitable alcohols include lower aliphatic alcohols such as methanol, ethanol, propanol, allyl alcohol, isopropanol, butanol, amyl alcohol, hexyl alcohol, cyclohexanol, glycol, methoxyethanol, ethoxyethanol, ethylmercaptoethanol, chloroethanol, propylene chlorohydrin and aminoethanol. Also suitable are phenols, chlorinated phenols such as p-chlorophenol, 2,4-dichlorophenol, 2,4,5-trichlorophenol, cresols, chlorocresols, isopropylphenols, butylphenols, 2-chloro-4-tert-butylphenol, and nitrophenols such as p-nitrophenol, 4-nitro-3-chlorophenol, 4-nitro-m-cresol, and 2,4-dichloro-6-nitrophenol, for example. Preferred reactants are methyl, ethyl, 2-chloroethyl, p-nitrophenol, 2,4-dichlorophenol and 2,4,5-trichlorophenol, because of exceptional pesticidal activity obtained with the esters prepared from these alcohols. No catalyst is required for this process and it, too, is usually conducted at atmospheric pressure, although sub- or super-atmospheric pressures can also be utilized.

The reaction products of the invention wherein R" is halogen, alkoxy, phenoxy, halogenated and/or nitrated phenoxy (with or without alkyl groups on the phenyl ring), amino, alkylamino, or dialkylamino are in general pesticidal and herbicidal, possessing activity on insects, mites, nematodes, other lower animal pests, weeds and plants.

The initial reaction leading to the compounds of the invention (where R" is halogen) is surprising and unexpected in view of the prior art. It has been known from the work of Michaelis, Arbuzov and others that the usual reaction of chlorinated hydrocarbon compounds with a phosphate is:

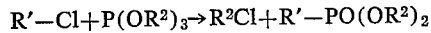

i.e., that the phosphorus containing product is a phosphonate. The fact that the reaction of the present invention does not take this usual course is shown by the presence of a —PO—Cl structure (detectible by its reaction with compounds which characteristically react only with acid chlorides under the conditions employed) and by the hydrolysis of the phosphate ester linkage to yield alcohols of the structure $C_5X_5ROH$.

The pesticidal compounds of the invention are applied in toxic amounts, preferably in diluted form, to the locus of the pest to be controlled. In the herbicidal method, the compounds of the invention are applied, as by spraying, to the plant growth to be controlled in the form of an emulsion prepared with the aid of an organic solvent and an emulsifier, a solution in mineral oil or other organic solvent, or in dry powder or granular form. The halogenated phosphorohalidates and their derivatives, when used as herbicides, are employed at a rate of about 1 to 40 pounds per acre. The rates preferred in any given situation depend upon the species of plant growth to be controlled, state of growth, vigor, degree of kill required, climatic conditions and various other factors normally considered by those skilled in the art. However, amounts of less than about one pound and up to about 100 pounds per acre of the novel compounds may be employed with satisfactory results. It is preferred to employ the compounds at a rate of about five to 20 pounds per acre.

The novel compounds may be employed as herbicides in substantially pure form. Preferably they are combined with one or more of the following: a solvent, a surface active agent, a solid carrier usually powdered, a liquid carrier, and other herbicides. Thus, the herbicides may be used alone or as components of liquid or solid formulations.

For example, the novel compounds of this invention may be incorporated into liquid formulations by diluting, dispersing, dissolving or emulsifying them with surface active adjuvants or a combination of adjuvants in organic solvents such as petroleum hydrocarbons, alcohols, ketones, esters, glycols, or combinations thereof. Alternatively, the novel herbicides may be made up as solid formulations, such as powders, dusts, wettable dusts, granules and pellets, using dry diluents such as talcs, clays, flours, starches, diatomaceous earth, mica, alkaline earth limes, carbonates and phosphates in finely divided, granular or pelletized form. The solid and liquid formulations facilitate handling and application at the desired rates and sometimes enhance the herbicidal activity to more than the additive degree.

Liquid compositions of active agent, whether solutions, dispersions in a liquid, or dispersions in wettable powder or dust, may contain as a conditioning agent one or more surface active agents in amounts sufficient to render the composition readily dispersible in water. By the term "surface active agents" are meant wetting agents, dispersing agents, emulsifying agents, and the like. A satisfactory but not complete list of such agents is set forth in an article in "Soap and Chemical Specialties," vol. 31, No. 7, pages 50–60; No. 8, pages 48–61; No. 9, pages 52–67; and No. 10, pages 38 (67) (1955). Other diluent materials are mentioned in Bulletin E–607 of the Bureau of Entomology and Plant Quarantine of the United States Department of Agriculture.

Usually, the proportions of solvent medium or liquid or solid carrier to herbicidally active material will be within the range of 1:1 to 1000:1 and preferably 3:1 to 200:1. The proportions of surface active agent to herbicide will usually be from about 0.1:1 to 100:1 and preferably about 0.1:1 to 10:1.

The pesticidal method of the invention is preferably effected by contacting a toxic amount of the compounds of the present invention in the form of emulsions in water, solutions in organic solvents, or formulations on solid carriers such as a dust, wettable powder or granules and the like, with the pests to be controlled. Insects are controlled by applying to the locus of the present or anticipated insect infestation a compound of the present invention at a preferred rate of about 0.25 to five pounds per acre. The rates may be greater than or less than the preferred rates, depending on the particular insect to be controlled, its resistance and stage of growth, the active ingredient used, climatic conditions and various other factors known to the art. However, when applying the pesticidal compounds for the control of insects on plants, it is preferred to maintain the pesticidal amount below the lethal rate for the plant to which it is being applied. However, this generally is not difficult to accomplish because the lethal rate for insects is substantially less than that required to kill the plants.

The following specific examples further illustrate the invention. However, this detailed disclosure is not to be construed as limiting the scope of the invention.

In the specification, examples, and claims, parts are by weight and temperatures are in degrees centigrade, unless otherwise indicated.

Example 1.—Reaction of ethyl ethylene phosphite and hexachlorocyclopentadiene yielding a 1:1 reaction product 27.3 grams of hexachlorocyclopentadiene were dissolved in 50 milliliters of benzene and 13.6 grams of ethyl ethylene prosphite were added thereto dropwise. The reaction mixture was spontaneously heated up to 56 degrees centigrade. When the exotherm subsided after completion of the addition, the phosphite titration (by iodimetry) was zero. The mixture was then allowed to stir overnight. The solvent was carefully removed and the hexachlorocyclopentadiene remaining was carefully distilled off from the reaction mixture. The mixture was then distilled in a Hickman still, yielding a liquid product distilling at 90 to 100 degrees centigrade at 17 to 20 microns of mercury pressure. The analysis corresponds to that of the product of the reaction of one mole of phosphate and one mole of hexachlorcyclopentadiene or $C_9H_9O_3Cl_6P$.

Analysis.—Calculated for $C_9H_9O_3Cl_6P$. Percent Cl, theoretical: 52.1. Found: 52.4.

Example 2.—Preparation of phenyl pentachlorocyclopentadienylethyl phosphorochloridate 185 grams of phenyl ethylene phosphite were gradually added to a refluxing solution of 273 grams of hexachlorocyclopentadiene in two volumes of benzene. Completion of the reaction was observed by loss of reducing power of an aliquot, when titrated with standard iodine solution in benzene. Removal of the solvent under vacuum provided the desired product, a viscous syrup having substantially the correct phosphorus and chlorine analysis.

A 25-gram portion of the product of Example 2 was refluxed for a week with 3 N hydrochloric acid in aqueous ethanol. The solution was freed of solvent under pressure, and the residue was taken up in benzene. The phenol was removed by a rapid washing with cold dilute sodium hydroxide solution. The benzene layer was further washed with water and dried over magnesium sulfate. Removal of the benzene under reduced pressure and fractional distillation yielded a product characterized by correct chlorine analysis, absence of phosphorus and presence of infrared hydroxyl bands, as in pentachlorocyclopentadienylethyl alcohol. This was a viscous yellowish liquid, distillable in a short-path still; B.P. 100–110 degrees centigrade (0.005 mm. mercury).

Example 3.—Preparation of 2,4,5-trichlorophenyl pentachlorocyclopentadienylethyl phosphorochloridate To a refluxing solution of 273 grams of hexachlorocyclopentadiene were gradually added 287 grams of 2,4,5-trichlorophenylethylene phosphite (prepared analogously to procedure of U.S. Patent 2,841,608). When an aliquot titrated with standard iodine solution showed no remaining phosphite, the reaction mixture was stripped under vacuum at 80 to 100 degrees centigrade to remove solvent, leaving a reddish syrup, having the correct phosphorus and chlorine analysis.

Example 4.—Preparation of diethyl pentachlorocyclopentadienylethyl phosphate

A solution of 409 grams of the product of Example 1 dissolved in 1,000 cc. of dimethylether of ethylene glycol, was treated at reflux with a solution of 68 grams of sodium ethoxide in 1,000 cc. of the same solvent. After two days at reflux, the solution was evaporated to remove the solvent, the residue was taken up in benzene, the sodium chloride was filtered off (one mole isolated), and the benzene filtrate was evaporated under vacuum to leave the desired product as an oily residue having the correct chlorine and phosphorus analysis.

In a similar manner to Example 4, the corresponding bromine compound is prepared by employing a similar amount of hexabromocyclopentadiene in the place of hexachlorocyclopentadiene resulting in the product of the formula $C_{11}H_{19}O_9Br_5P$.

Example 5.—Preparation of ethyl pentachlorocyclopentadienylethyl phosphoramidate A solution of 409 grams of the product of Example 2 in 1,000 cc. of dioxane is cooled to 10 degrees and ammonia passed in until about 40 grams had dissolved. The solution was then sealed in an autoclave and maintained at 100 degrees for one day. The solution is then cooled and filtered to remove ammonium chloride and evaporated to remove the dioxane, leaving a reddish-brown syrup which partially set to a wax on standing. The amino group was shown to be part of an amide structure by the insolubility of the product in aqueous hydrochloric acid.

Example 6.—Preparation of 2,4-dichlorophenyl pentachlorocyclopentadienylethyl phosphorochloridate In the manner of Example 3, 2,4-dichlorophenyl ethylene phosphite was reacted with hexachlorocyclopentadiene to obtain a viscous syrup having the correct analysis for the desired product and capable of reaction with amines to form amides as per the following example.

Example 7.—Preparation of 2,4-dichlorophenyl pentachlorocyclopentadienylethyl isopropylphosphoroamidate A solution of 526 grams of the product of Example 6 in 1,000 cc. of benzene was heated with 119 grams of isopropylamine for 24 hours at reflux. The solution was then washed with cold water to remove isopropylamine hydrochloride, and then was evaporated to dryness to obtain a viscous amber syrup, insoluble in aqueous hydrochloric acid and having substantially the correct analysis for the indicated product.

Example 8.—Preparation of ethyl pentachlorocyclopentadienylethyl N,N-diethylphosphoramidate In the manner of the preceding example, the product of Example 1 was reacted with 2 molor equivalents of diethylamine to obtain an amber viscous syrup, insoluble in cold dilute or cold concentrated hydrochloric acid and therefore shown to be an amide rather than an amine. The product has the correct nitrogen analysis for the desired amide.

Example 9.—Preparation of ethyl p-nitrophenyl pentachlorocyclopentadienyl ethyl phosphate A solution of 409 grams of the product of Example 1 in 1,000 cc. of dioxane was heated at 100 degrees centigrade for two days with 161 grams of sodium p-nitrophenoxide and one gram of cuprous chloride as catalyst. The solution was then cooled and filtered, to remove approximately one mole of sodium chloride.

The residue obtained on evaporation of the solvent was a reddish brown syrup, shown by infrared to contain the nitrophenoxy radical.

In a similar manner to Example 9, the corresponding bromine compound is prepared by using a similar hexabromocyclopentadiene in the place of hexachlorocyclopentadiene resulting in a product of the formula $C_{15}H_{13}O_6Br_5NP$.

Example 10.—Preparation of Phenyl 3-(pentachlorocyclopentadienyl)-2,2-dimethylpropyl Phosphorochloridate One mole of phenyl neopentylene phosphite (U.S. Pat. 2,834,798) was refluxed in benzene with one mole of hexachlorocyclopentadiene, until titration of an aliquot showed no phosphite remaining. Upon evaporation of the solvent, the product obtained was a viscous syrup, having one reactive acid chloride chlorine atom per mole (as shown by reaction with two moles of diethylamine to obtain an N,N-diethyl amide.

Example 11

The products of Examples 4, 5, 6 and 10 were dissolved in xylene (100 parts of xylene to 1 part by weight of compound), plus Triton X–100 (non-ionic emulsifier) and dispersed in water to form emulsions containing 0.5 percent active ingredient. These emulsions were sprayed on plants infested with pea aphids and with mites (*Tetranychus atlanticus*). Substantially complete kill of both species was recorded 24 hours later. Control plants treated with the xylene-emulsifier combination alone showed no aphid or mite kill.

Example 12

The utility of the phosphoroamidates of the invention as herbicides is illustrated by the following test. The product of Example 8, applied at 20 pounds per acre to turf infested with seeds of crabgrass (*Digitaria sanguinalis*) substantially prevented normal germination and emergence of crabgrass.

Example 13.—Reaction of ethyl ethylene phosphite and hexachlorocyclopentadiene yielding a 2:1 reaction product 27.3 grams of hexachlorocyclopentadiene were dissolved in 50 milliliters of benzene, followed by the dropwise addition of 13.6 grams of ethyl ethylene phosphite, dissolved in 25 milliliters of carbon tetrachloride. The mixture was heated and the temperature was kept below 10 degrees centigrade. After standing for several days, the mixture was carefully stripped of solvent and the hexachlorocyclopentadiene and trade of the lower boiling compounds present were removed in a Hickman-type molecular still. The oil analyzed as a product of 2 moles of phosphite and 1 mole of hexachlorocyclopentadiene.

*Analysis.*—Calculated for $C_{13}H_{18}Cl_6O_6P_2$. Percent P, theoretical: 11.9. Found: 11.4. Percent Cl, theoretical: 39.2. Found: 35.9.

Example 14.—Reaction of ethyl ethylene phosphite and hexachlorocyclopentadiene at a 5:1 ratio of reactants A solution of 13.7 grams (0.05 mole) of hexachlorocyclopentadiene and 50 milliliters of benzene were treated by dropwise addition, with 42.4 grams of ethyl ethylene phosphite dissolved in 140 milliliters of benzene. The reaction was followed by titration with 0.1 N iodine in benzene. After the reaction mixture had been stirred overnight, the titration indicated the titration indicated the consumption of 5 moles of phosphite per mole of hexachlorocyclopentadiene.

The reaction mixture was stripped to 100 degrees centigrade at 0.001 millimeter of mercury to remove unreacted phosphite, leaving a viscous syrup having a correct phosphorus analysis for the desired substituted cyclopentadiene, considered as being of the formula:

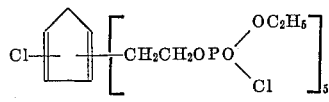

Example 15

The utility of the products of the invention as herbicides is further illustrated by this example.

An aqueous emulsion of the product of Example 1 is sprayed at the rate of 20 pounds per acre onto a mixed weed population consisting largely of pigweed and ragweed. After two days, substantially complete weed kill is observed.

Employing the product of Examples 4 and 5 at the same rate, about 80 and 90 percent weed kill, respectively, is observed under similar conditions.

Upon replacement of the respective active agents of Examples 11, 12 and 15, with compounds such as:

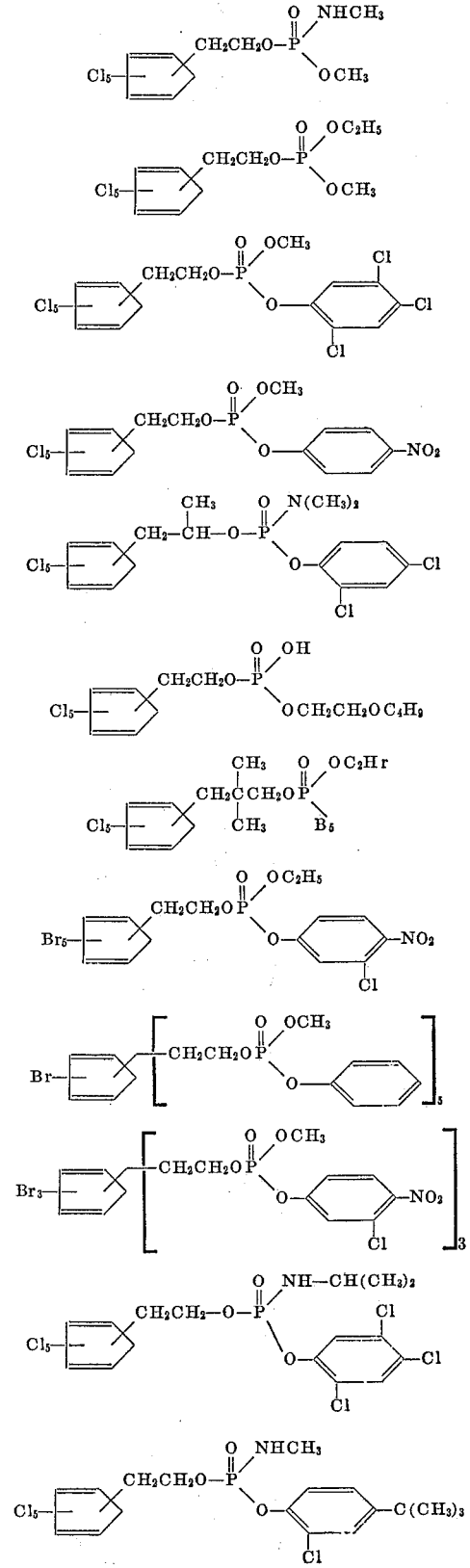

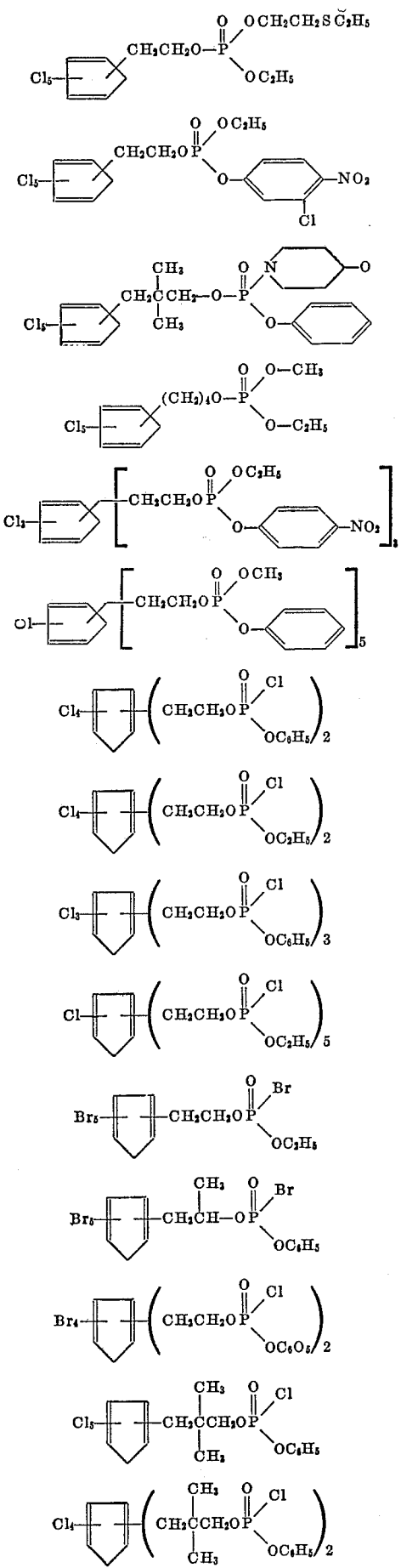

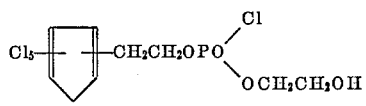

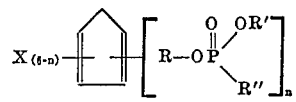

or the like, similar pesticidal and herbicidal activity is observed.

What is claimed is:

1. A method for controlling pests selected from the group consisting of insects, mites and nematodes which comprises applying to the locus of said pests a pesticidal amount of a compound of the formula:

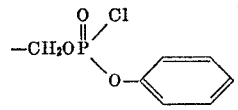

wherein:
X is selected from the group consisting of chlorine and bromine;
n is from 1 to 5;
R is selected from the group consisting of:
  (1) unsubstituted alkylene
  (2) alkylene substituted with a substituent selected from the group consisting of:
    (a) alkyl
    (b) aryl
    (c) halogen
    (d) nitro
    (e) hydroxy
    (f) polyhalocyclopentadienyl
    (g) alkoxy
    (h) aryloxy
    (i)

$$-CH_2OP\overset{O}{\underset{O-}{\|}}\diagdown_{Cl}$$

the free valences of said alkylene being on two different carbon atoms, which, when separated, are separated by no more than 2 carbon atoms;
R' is selected from the group consisting of:
  (1) unsubstituted alkyl
  (2) alkyl substituted with a substituent selected from the group consisting of:
    (a) nitro
    (b) aryl
    (c) halogen
    (d) hydroxy
    (e) alkoxy
    (f) aryloxy
  (3) unsubstituted aryl
  (4) aryl substituted with a substituent selected from the group consisting of:
    (a) nitro
    (b) alkyl
    (c) bromine
    (d) chlorine
    (e) hydroxy
    (f) alkoxy
    (g) aryloxy
R'' is selected from the group consisting of:
  (1) chlorine
  (2) bromine
  (3) hydroxy
  (4) amino
  (5) alkyl substituted amino
  (6) alkoxy
  (7) alkoxyalkoxy
  (8) alkylmercaptoalkoxy (9) aryloxy
(10) alkyl-substituted aryloxy
(11) chloro-substituted aryloxy
(12) bromo-substituted aryloxy
(13) nitro-substituted aryloxy said alkylene being from 2 to about 6 carbon atoms; said alkyl being from 1 to about 20 carbon atoms; said aryl being from 6 to about 14 carbon atoms; said alkoxy being from 1 to about 20 carbon atoms; and said aryloxy being from 6 to about 14 carbon atoms.

2. A method in accordance with claim 1, wherein R" is chlorine.

3. A method in accordance with claim 1, wherein R" is amino.

4. A method in accordance with claim 1, wherein R" is alkoxy.

5. A method in accordance with claim 1, wherein the pesticidal amount is from 0.25 to five pounds per acre.

6. A method in accordance with claim 1, wherein the compound is diethyl pentachlorocyclopentadienylethyl phosphate of the formula:

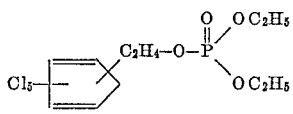

7. A method in accordance with claim 1, wherein the compound is ethyl pentachlorocyclopentadienylethyl phosphoramidate of the formula:

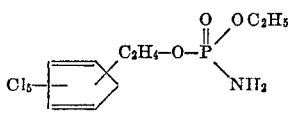

8. A method in accordance with claim 1, wherein the compound is 2,4-dichlorophenyl pentachlorocyclopentadienylethyl phosphorochloridate of the formula:

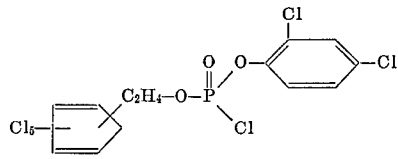

9. A method in accordance with claim 1, wherein the compound is phenyl 3-(pentachlorocyclopentadienyl)-2,2-dimethylpropyl phosphorochloridate of the formula:

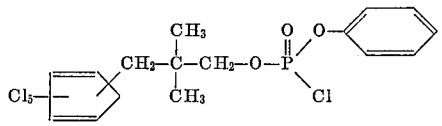

10. A method in accordance with claim 1, wherein the pests are insects.

11. A method in accordance with claim 1, wherein the compound is combined with a formulation adjuvant selected from the group consisting of solvent, liquid carrier and solid carrier.

References Cited

UNITED STATES PATENTS

| | | | |
|---|---|---|---|
| 3,091,565 | 5/1963 | Suzuki et al. | 424—222 |
| 3,151,146 | 9/1964 | Schrader et al. | 424—222 |

ALBERT T. MEYERS, Primary Examiner

D. R. MAHANAND, Assistant Examiner

U.S. Cl. X.R.

71—86, 87; 424—218, 219, 357

PO-1050
(5/69)

UNITED STATES PATENT OFFICE
CERTIFICATE OF CORRECTION

Patent No. 3,482,019             Dated December 2, 1969

Inventor(s)         Edward D. Weil and Sheldon B. Greenbaum

It is certified that error appears in the above-identified patent and that said Letters Patent are hereby corrected as shown below:

Column 1, line 61 and 62, delete "hy-hydrogen" and insert -- hydrogen --. Column 2, line 12, delete "alkl" and insert -- alkyl --; column 2, line 18, delete "alkoxyalkoxyl" and insert -- alkoxyalkoxy --; column 2, line 35, the first half of the second formula should appear as follows:

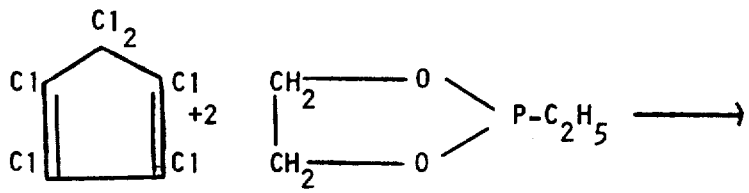

Column 2, line 43, the first half of the third formula should appear as follows:

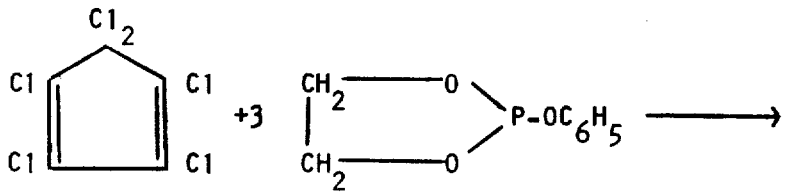

Column 2, line 57, the first half of the fifth formula should appear as follows:

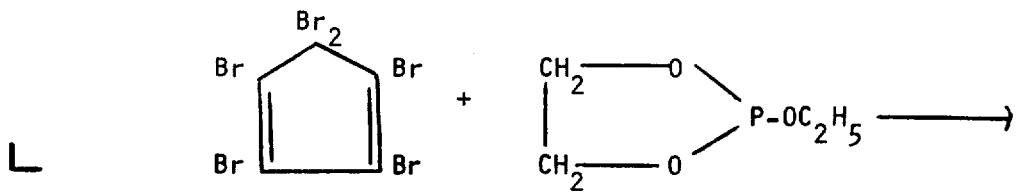

UNITED STATES PATENT OFFICE
CERTIFICATE OF CORRECTION

Patent No. 3,482,019    Dated December 2, 1969

Inventor(s)   Edward D. Weil and Sheldon B. Greenbaum

It is certified that error appears in the above-identified patent and that said Letters Patent are hereby corrected as shown below:

Column 3, line 3, the first half of the first formula should appear as follows:

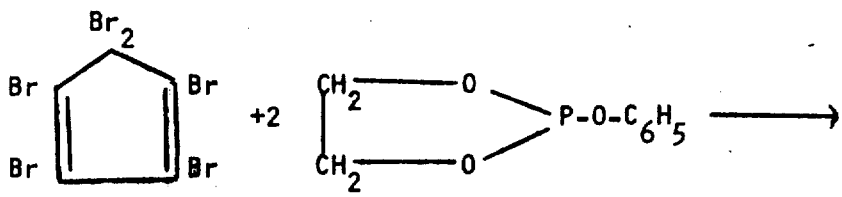

Column 3, line 37, the first half of the fifth formula should appear as follows:

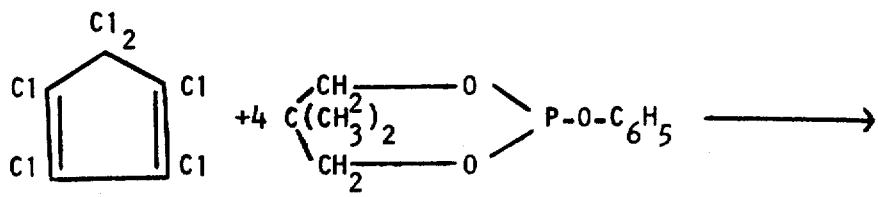

Column 3, line 40, the second half of the fifth formula should appear as follows:

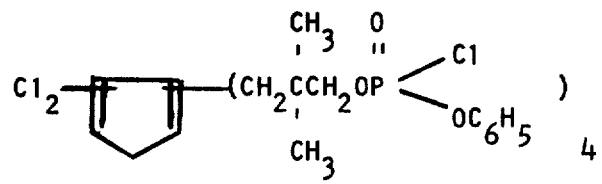

PO-1050
(5/69)

UNITED STATES PATENT OFFICE
CERTIFICATE OF CORRECTION

Patent No. 3,482,019    Dated December 2, 1969

Inventor(s) Edward D. Weil and Sheldon B. Greenbaum

It is certified that error appears in the above-identified patent and that said Letters Patent are hereby corrected as shown below:

Column 3, line 55, the first half of the formula should appear as follows:

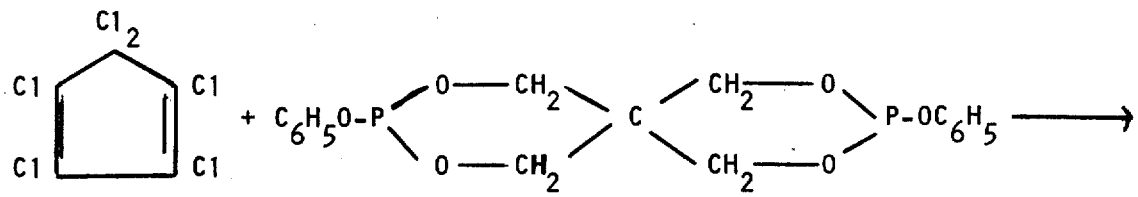

Column 4, line 19, delete "20" and insert -- -20 --. Column 7, line 19, "prosphite" should be -- phosphite --. Column 9, line 58, delete "the titration indicated the titration indicated" and insert -- the titration indicated --. Column 10, line 43, the seventh formula should appear as follows:

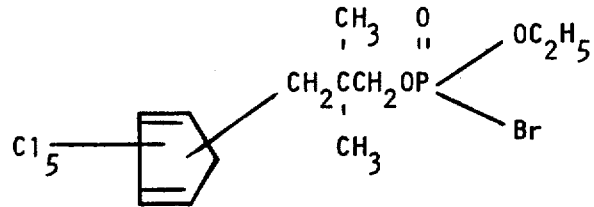

SIGNED AND
SEALED
SEP 22 1970

(SEAL)
Attest:

Edward M. Fletcher, Jr.
Attesting Officer

WILLIAM E. SCHUYLER, JR.
Commissioner of Patents